Feb. 4, 1947.        R. J. NEWMAN         2,415,108
              CYLINDER TESTING METHOD
                   Filed June 15, 1945
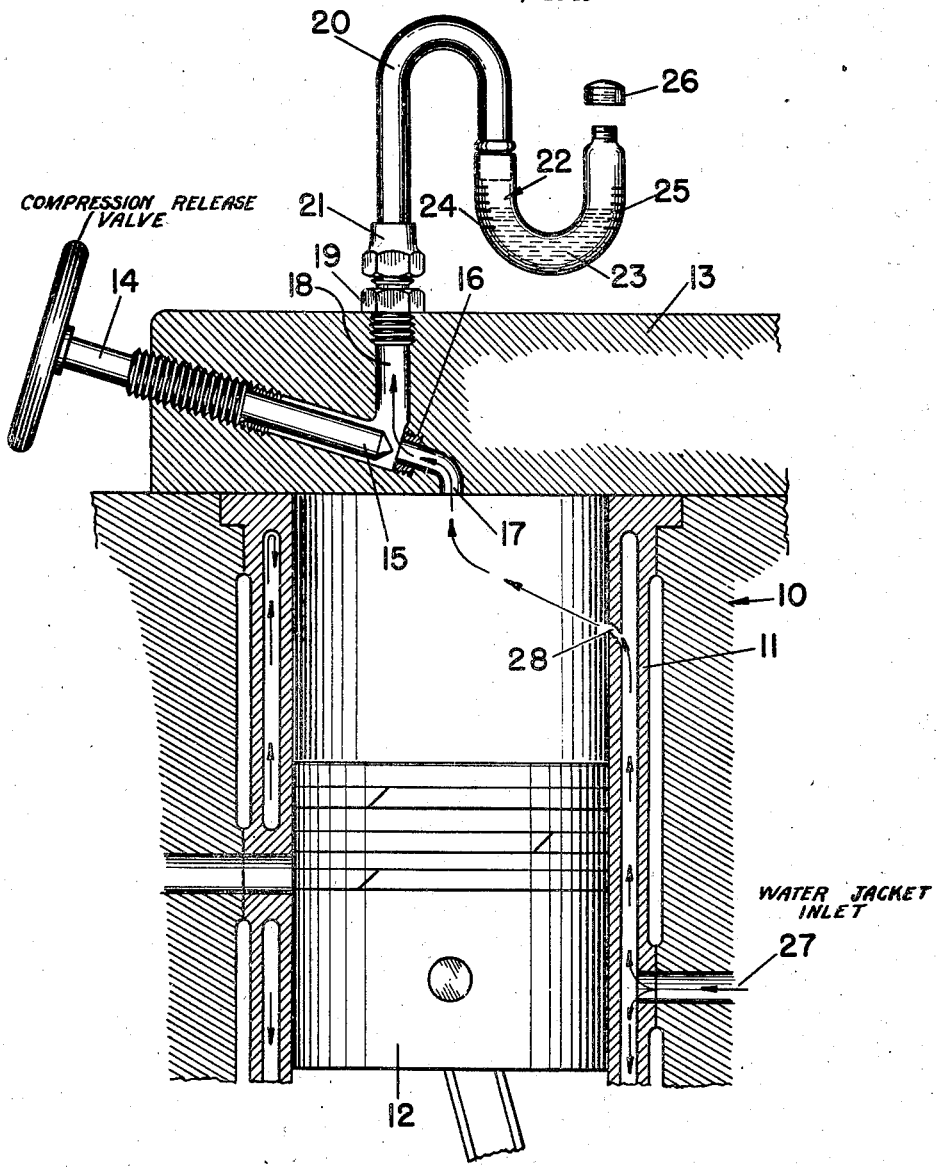
RAYMOND J. NEWMAN Patented Feb. 4, 1947

2,415,108

UNITED STATES PATENT OFFICE 2,415,108

CYLINDER TESTING METHOD

Raymond J. Newman, United States Navy

Application June 15, 1945, Serial No. 599,737

2 Claims. (Cl. 73—40)

(Granted under the act of March 3, 1883, as amended April 30, 1928; 370 O. G. 757)

This invention relates to testing device and more particularly to a new and improved method and apparatus for detecting cracked or defective internal combustion engine cylinder blocks.

Heretofore it has been a problem to provide a simple means and apparatus for testing the integrity of the blocks and water jackets of an internal combustion engine without making extensive alterations in the engine for testing purposes. The present invention provides apparatus which may readily be adapted to the conventional internal combustion engine and which does not require extensive alteration of the engine or time consuming changes to be made.

It is an object of the present invention to provide a light and inexpensive apparatus for testing the integrity of portions of an internal combustion engine and more particularly to provide a device which may be readily attached and operated in conjunction with the conventional internal combustion engine fittings.

Other objects and advantages will be hereinafter more fully described and for a complete understanding of the nature, scope and characteristics of this invention reference may now be had to the following description and accompanying drawing in which;

The single figure illustrates a vertical sectional view through a cylinder of an internal combustion engine on which the device of the present invention is shown attached.

Referring to the drawing in detail; the conventional cylinder block 10 is shown provided with the usual inner liner 11 within which is positioned a vertically reciprocatable piston 12. As appears particularly in marine Diesel engines the cylinder head 13 of the engine is provided with a compression release valve 14 operable to withdraw a valve stem 15 from a seat 16 so as to permit communication from within the cylinder through a compression release passage 17 and outlet passage 18 into the end of which passage a threaded fitting 19 may be inserted as shown.

To the fitting 19 may be secured a test gage tube 20 having a coupling nut 21 at its lower end and provided with an upturned transparent double leg monometer 22 at the opposite end.

Within the manometer 22 may be located suitable indicating fluid 23 which may be mercury, water or other fluid as desired for the test under consideration and the transparent manometer 22 may be provided with suitable indicia 24 and 25 upon each leg thereof so that changes in the level of the fluid may readily be noted and recorded. A cap 26 may be provided to close the end of the manometer when not in use.

In operation the testing device may be installed at the compression release valve outlet for the particular cylinder which it is desired to test and, thereafter, pressure may be applied through the water jacket inlet 27 for that cylinder. This pressure passes as indicated by the arrows throughout the water jacket. If a crack or break such as the opening 28 is present in the liner of the cylinder the pressure coming through line 27 will leak within the cylinder and will pass through the passages 17 and 18 and into the test instrument, moving fluid 23 in the manometer and providing a test result which can be determined by computing the difference between the indicia 24 and 25.

Obviously this test will work equally well for the cylinder where there is no liner but where there exists a leak in the cylinder block or in the gasket between the usual water jacket and the interior of the engine cylinder.

While there is shown a particular embodiment of this invention it will be understood that it is not desired to be limited thereto since more modifications may be made and it is desired to be limited only by the description and the scope of the appended claims.

The invention described herein may be manufactured and used by or for the Government of the United States of America for governmental purposes without the payment of any royalties thereon or therefor.

I claim:

1. The method of testing the integrity of the cylinder wall of an internal combustion engine for leakage in situ in the cylinder, comprising utilizing the coolant jacket inlet, emptied of coolant, as a path to outside of the wall securing the inside of the cylinder against possible pressure loss other than through the wall, applying pressure to one side of the wall, and utilizing a pressure change indicating means on the other side of the wall to indicate any pressure leak through the wall.

2. The method of testing the integrity of the lining of the cylinder wall of an internal combustion engine for leakage while the lining is in situ in the cylinder, comprising utilizing the coolant jacket inlet, emptied of coolant, as a path to outside of the lining, securing the inside of the cylinder against possible pressure loss other than through the lining, applying pressure to one side of the lining, and utilizing a pressure change indicating means on the other side of the lining to indicate any pressure leak through the lining.

RAYMOND J. NEWMAN.

REFERENCES CITED

The following references are of record in the file of this patent:

UNITED STATES PATENTS

| Number | Name | Date |
|---|---|---|
| 1,643,886 | Goodman | Sept. 27, 1927 |
| 1,646,311 | Page | Oct. 18, 1927 |
| 1,649,287 | Butler | Nov. 15, 1927 |
| 1,649,994 | Thal | Nov. 22, 1927 |
| 1,337,132 | Harpst | Apr. 13, 1920 |